United States Patent
McKenna et al.

(10) Patent No.: US 10,394,807 B2
(45) Date of Patent: Aug. 27, 2019

(54) REWRITE CONSTRAINTS FOR DATABASE QUERIES

(71) Applicant: ParAccel LLC, Campbell, CA (US)

(72) Inventors: William J. McKenna, Oceanside, CA (US); Richard L. Cole, Los Gatos, CA (US); Yijou Chen, Cupertino, CA (US); Sergei Perfilov, San Jose, CA (US); Aman Sinha, San Jose, CA (US); Eugene Szedenits, Jr., Ypsilanti, MI (US)

(73) Assignee: ParAccel LLC, Campbell, CA (US)

( * ) Notice: Subject to any disclaimer, the term of this patent is extended or adjusted under 35 U.S.C. 154(b) by 472 days.

(21) Appl. No.: 14/538,032

(22) Filed: Nov. 11, 2014

(65) Prior Publication Data

US 2015/0149436 A1    May 28, 2015

Related U.S. Application Data (60) Provisional application No. 61/909,852, filed on Nov. 27, 2013.

(51) Int. Cl.
*G06F 16/2453* (2019.01)
(52) U.S. Cl.
CPC ................ *G06F 16/2453* (2019.01)
(58) Field of Classification Search
CPC ............. G06F 17/30463; G06F 9/4881; G06F 17/30477; G06F 17/30433; G06F 17/30442; G06F 17/30466
USPC .......... 707/718, E17.017, E17.014, E17.005, 707/719, 803, E17.012, E17.044, 707/E17.131, 609, 714, 769, 797, 802, 707/E17.056, E17.11, 602, 702, 713, 722, 707/737, 743, 744, 760, 774; 718/102, 718/104, 1, 100; 705/7.12, 36 R, 2, 27.1, 705/35, 14.43, 1.1, 26.1, 26.4, 301, 305, 705/342, 348, 500, 6, 7.15, 7.18, 7.23, 705/7.25, 7.27, 7.28, 7.29, 7.36, 7.37; 701/20, 19, 1, 102, 103, 2, 21, 23, 3
See application file for complete search history.

(56) References Cited

U.S. PATENT DOCUMENTS

| | | | | |
|---|---|---|---|---|
| 5,666,525 A | * | 9/1997 | Ross ................ | G06F 17/30498 |
| 5,905,982 A | * | 5/1999 | Carey ............... | G06F 17/30607 |
| | | | | 707/694 |
| 6,775,662 B1 | * | 8/2004 | Witkowski ........ | G06F 16/24537 |

(Continued)

*Primary Examiner* — Jay A Morrison
*Assistant Examiner* — Ken Hoang
(74) *Attorney, Agent, or Firm* — Fenwick & West LLP (57) ABSTRACT

A database system rewrites database queries based on rewrite constraints specification. The rewrite constraints specification provides directives to the database system to generate temporary tables for storing intermediate results of database queries and rewrite the corresponding database queries in terms of the temporary tables. The subqueries for matching the rewrite constraints specification may be specified in various ways. For example, the rewrite constraints specification may identify the subqueries by using one or more aliases. The rewrite constraints specification may specify a list of tables such that all database queries that join the database tables specified in the rewrite constraints specification are determined to match. The optimizer is able to optimize the rewritten database queries better by getting a better estimate for the statistics describing the temporary tables.

19 Claims, 4 Drawing Sheets

(56) References Cited

U.S. PATENT DOCUMENTS

| | | | |
|---|---|---|---|
| 7,392,250 B1* | 6/2008 | Dash | G06F 17/30539 707/600 |
| 7,925,665 B2* | 4/2011 | Schneider | G06F 17/30545 707/716 |
| 9,336,272 B1* | 5/2016 | Thombre | G06F 17/30442 |
| 2005/0125398 A1* | 6/2005 | Das | G06F 17/30306 |
| 2006/0047622 A1* | 3/2006 | Folkert | G06F 17/30451 |
| 2007/0038618 A1* | 2/2007 | Kosciusko | G06F 17/30448 |
| 2010/0250518 A1* | 9/2010 | Bruno | G06F 17/30386 707/718 |
| 2015/0088919 A1* | 3/2015 | Hunter | G06F 17/30451 707/759 |

* cited by examiner

REWRITE CONSTRAINTS FOR DATABASE QUERIES

CROSS REFERENCE TO RELATED APPLICATION

This application claims the benefit of U.S. Provisional Application No. 61/909,852 filed on Nov. 27, 2013, which is incorporated by reference in its entirety.

BACKGROUND

This application relates generally to database query optimization and in particular to using rewrite constraints for rewriting database queries.

Databases store large amount of data that is processed in response to database queries. Typically databases generate an execution plan for the queries. The execution plan comprises various operators and order of execution of these operators so as to execute a database query. A database query optimizer typically evaluates several execution plans to select a particular query plan for execution. The query optimizer selects the query plan that the optimizer estimates as the best query plan for executing the database query.

Generating the optimal query plan is a complex process that can take significant amount of time depending on the complexity of a query. Query optimizers use statistics describing tables used in queries to determine an execution plan for the query. If the query optimizer does not have statistics describing a table used in a query, the optimizer is likely to make incorrect decisions in selecting an execution plan. For example, statistics for intermediate results generated during execution of a query are typically not available. As a result, query optimizers generate suboptimal execution plans for complex queries that require one or more intermediate results to be processed.

Often users, for example, database experts may be able to improve upon a query plan generated by an optimizer. Some optimizers allow users to provide optimizer hints. However, hints allowed by optimizers have limited expressive power. Furthermore, optimizer hints are typically not mandatory and the optimizer can chose to ignore them if the optimizer determines that it can generate better execution plans by ignoring the hints. The optimizer may ignore the hints even if the optimizer incorrectly determines that it can generate a better execution plan. As a result, conventional database systems are often unable to generate optimal (or close to optimal) execution plans for several types of database queries, thereby resulting in inefficient execution of these database queries.

SUMMARY

Embodiments disclosed herein rewrite database queries based on rewrite constraints specification. The rewrite constraints specification provides directives to the database system to generate temporary tables for storing intermediate results of database queries and rewrite the corresponding database queries in terms of the temporary tables. Explicitly creating these temporary tables allows the database system to estimate accurate statistics related to these temporary tables, thereby allowing the database system to optimize the corresponding database queries better.

In an embodiment, the database system receives a rewrite constraints specification. The rewrite constraints specification identifies a subquery that can occur in database queries. The identified subquery causes an intermediate result relation to be generated during execution of the containing database query. The database system matches the rewrite constraints specification with a set of database queries. The database system determines that the rewrite constraints specification is applicable to a database query if the subquery identified in the rewrite constraint matches with at least a portion of the database query. The database system performs the following computation for each matching database query. The database system generates a statement creating a temporary table for storing the intermediate result relation. The database system rewrites the matching database query by replacing the matching portion of the database query with the temporary table. The database system executes the rewritten database query.

The subqueries for matching the rewrite constraints specification may be specified in various ways. In some embodiments, the rewrite constraints specification identifies the subqueries by using one or more aliases. The rewrite constraints specification may specify a list of tables such that all database queries that join the database tables specified in the rewrite constraints specification are determined to match.

The features and advantages described in this summary and the following detailed description are not all-inclusive. Many additional features and advantages will be apparent to one of ordinary skill in the art in view of the drawings, specification, and claims.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Databases allow users to interact with the data stored in the database using a structured query language (SQL) interface. The SQL language allows users to execute SQL statements that can access and manipulate data from the database. A query optimizer generates execution plan for the database queries for execution. The query optimizer enumerates several execution plan choices and evaluates these plan choices so as to select an execution plan for executing the query.

A database system generates and stores statistics describing the tables stored in the database. The statistics may describe the size of the tables in terms of number of rows, sizes of data stored in the rows, distribution of data and so on. The query optimizer of the database system uses the statistics to make decisions regarding selection of an execution plan for executing the queries. If there are no statistics available for the query optimizer or if the statistics are old and outdated, the optimizer may make incorrect decisions while optimizing the execution plan of a query.

If a database query generates intermediate results, the data for the intermediate results may not be available for the query optimizer to generate statistics. For example, a query may comprise multiple subqueries such that the results of the subqueries are intermediate results. Similarly, a query may involve a complex join operation that is decomposed into smaller join operations such that the result of the smaller join operations forms an intermediate result. Accordingly, the query optimizer needs to estimate statistics for the intermediate results in order to generate execution plan for the query. As a result, the query optimizer often generates suboptimal query plan for complex queries that involve one or more intermediate results.

Embodiments disclosed herein allow users to specify rewrite constraints. The rewrite constraints provide directives to the query optimizer specifying how the database query should be rewritten. More specifically, the rewrite constraints specify which intermediate results of a database query should be materialized. In some embodiments, the intermediate results are materialized as temporary tables. These temporary tables may be stored in-memory if possible to avoid inefficiencies caused by writing the tables to secondary storage. As a result, the overhead of creating these temporary tables does not outweigh the overall performance improvement obtained by generating the temporary tables.

In some embodiments, the database system identifies intermediate results generated while processing a database query so that the optimizer can store the intermediate results in temporary tables. The database system rewrites the query such that the rewritten query comprises at least a statement generating the temporary table and a query expressed in terms of the generated temporary table.

Following is an example of a rewrite constraint provided by a user. The following rewrite constraint specifies an alias "dt" as identifying the subquery of a database query.

SET rewrite_constraint TO 'dt';

This rewrite constraint is applicable to all database queries that use at least a subquery that is identified using the alias "dt." For example, the following database query identifies a subquery "SELECT a1 FROM t1, t2 WHERE a1=a2 AND b1<10 AND b2>5 GROUP BY a1" using the alias "dt".

SELECT COUNT(*) FROM
 (SELECT a1 FROM t1, t2
  WHERE a1=a2 AND b1<10 AND b2>5 GROUP BY
   a1) AS dt(a1),
 t3 WHERE a1=a3;

The query optimizer matches the rewrite constraint with the above query and selects the above database query for being rewritten. Accordingly, the query optimizer generates a statement for creating a temporary table for storing the intermediate result generated by the subquery identified by the alias "dt." For example, the query optimizer generates the following statement.

CREATE TEMP TABLE tt_0(a1) AS
 SELECT t1.a1 AS a1 FROM t1, t2
  WHERE t1.b1<10 AND t1.a1=t2.a2 AND t2.b2>5
   GROUP BY 1;

The query optimizer also rewrites the database query to use the generated temporary table as follows.

SELECT COUNT(*) AS COUNT FROM t3, tt_0
 WHERE t3.a3=tt_0.a1;

As part of rewriting the database query, the query optimizer replaces references to columns from the alias "dt" to use corresponding columns of the temporary table "tt_0." For example the column a1 in the where clause "WHERE a1=a3" of the original database query is replaced by "tt_0.a1."

During execution of the database query, the temporary table tt_0 is generated as a result of execution of the generated "CREATE TABLE" statement. The query optimizer analyzes the generated temporary table to determine statistics describing the temporary table, for example, the size of the temporary table, the data distribution describing the temporary table, and so on.

Parallel Database System

Figure 1:
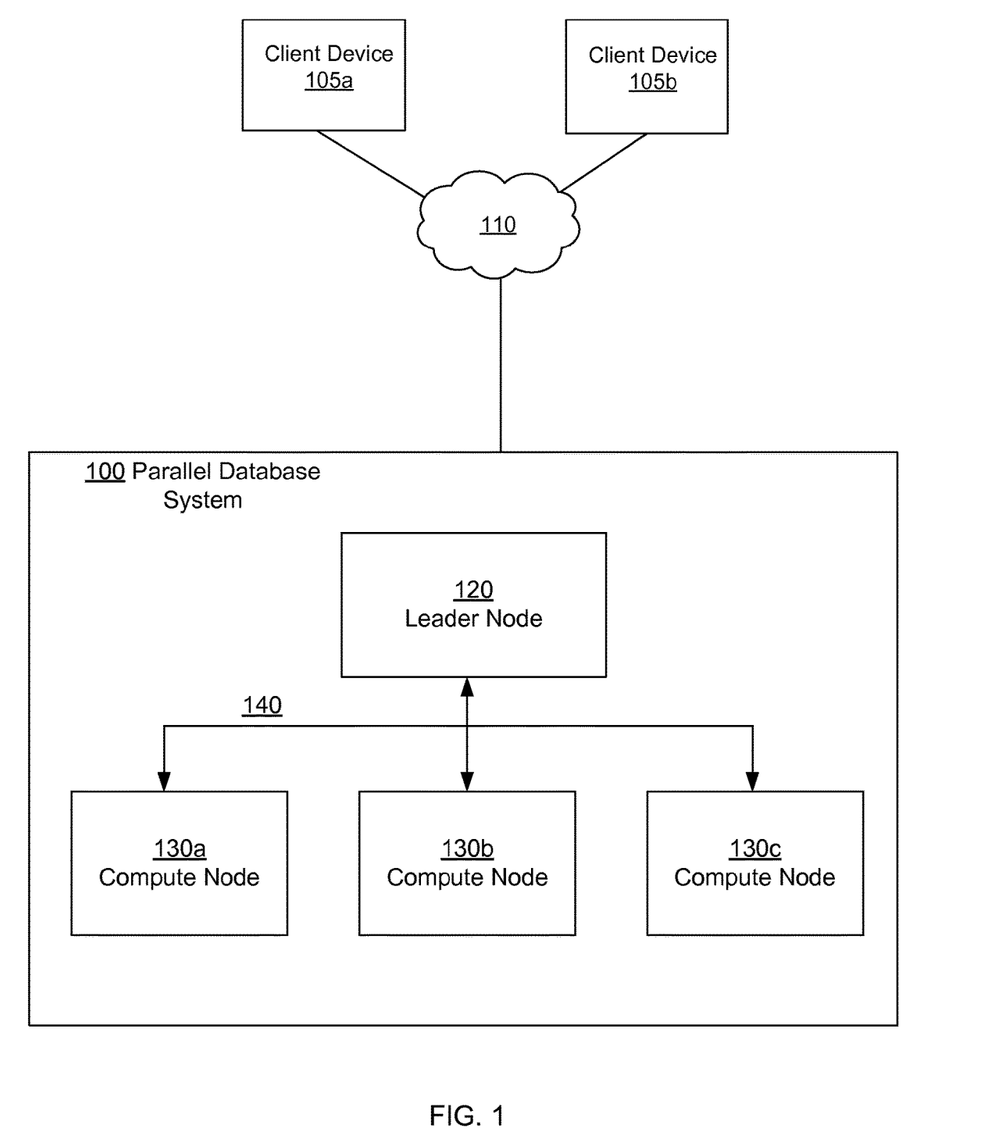
FIG. 1 shows the architecture of a parallel database system, in accordance with an embodiment of the invention.

FIG. 1 shows the overall system environment illustrating the architecture of a parallel database system 100, in accordance with an embodiment of the invention. The parallel database system 100 has four main architectural components: a leader node 120, one or more compute nodes 130, a parallel communication fabric 140, and an optional storage area network (SAN) (not shown in FIG. 1). (A letter after a reference numeral, such as "130a," indicates that the text refers specifically to the element having that particular reference numeral, while a reference numeral in the text without a following letter, such as "130," refers to any or all of the elements in the figures bearing that reference numeral.)

Although the system described herein is a parallel database system, techniques disclosed herein apply to a database system that is executed using a single processor. The rewrite constraints specifications can be used for a parallel database or for a database executing on a single processor.

The leader node 120 controls the execution of the compute nodes 130. All nodes 120, 130 communicate with each other via the parallel communication fabric 140. The leader node 120 and the compute nodes 130 can comprise any type of processors, for example, standard x86 servers running Linux or multi-core systems. Users and applications may communicate with the system via the leader node by using standard interfaces, ANSI SQL via ODBC/JDBC.

The leader node 120 may be connected to the network 110 and may interface with external applications and other computers using the network. A leader node 120 manages communications with the compute nodes 130. In an embodiment, the leader node 120 controls sessions, parsing and optimizing queries, and scheduling execution of the workload. The leader node 120 may or may not participate in data operations. The leader node 120 may be optimized for outward communication and handling of query overhead so the resources of the compute nodes 130 are utilized for performing data operations.

Compute nodes 130 are the components of the parallel database system 100 that perform processing and storing of data. Each compute node 130 stores and manages a subset of rows of each table. For example, if a table has 1 billion rows and there are 20 compute nodes, then approximately 50 million rows are distributed to each compute node 130.

Data may be distributed to a particular compute node 130 based on a particular data distribution strategy, for example, based on a hashing algorithm applied to a distribution key, or by round robin. Distribution keys, such as the primary key or other popular join column may be used for even distribution of data, especially when queries are likely to benefit from collocated joins by using the same distribution key. In cases where an inherently balanced distribution key isn't obvious or doesn't exist, round robin distribution may be used to balance the data.

By utilizing multiple methods of data distribution, it is possible to maintain the appropriate balance between data distribution and performance so the parallel database system 100 can take best advantage of its resources and provide good parallel efficiency. The performance of the parallel database system 100 is driven by the number of compute nodes 130 present. For example, with most applications, a 50-compute node system may perform almost 5× faster than a 10-compute node system.

Each compute node 130 depends on a set of processes to manage resources of that node, for example, communication, and secondary storage. In order to achieve maximum parallelism, the parallel database system 100 logically partitions data for all tables into multiple subsets per node so that multiple cores can be used to process the data for those tables during queries. These logical partitions are referred to as "slices", and in an embodiment, the number of slices per node is typically configured to correspond to the number of cores per node. Each slice is given a set of query execution processes at system startup, and parallelism is achieved by having the processes of all slices competing for the node's shared resources. Slices communicate with other slices via the communication fabric, but they may not be directly accessed by end user applications. In certain contexts, a slice refers to the portion of data that is allocated to a process (or core) for processing.

In an embodiment, the communication fabric 140 is a high performance fabric based on standard, 1 or 10 Gigabit Ethernet (GbE) and standard multi-port switches that have full crossbar support. The communication fabric 140 may use a custom protocol to enable highly efficient communication among each of the nodes (leader and compute). The communication fabric 140 delivers maximum interconnect performance because it is specifically designed for how traffic moves in a complex, parallel database environment. For example, communication fabric 140 is configured to efficiently handle movements of large intermediate result sets, data redistribution, low rate of packet loss and so on. In some embodiments, communication fabric 140 uses multiple links simultaneously running multiple data streams. The communication fabric 140 is implemented internally as multiple independent networks all communicating data for the parallel database system 100. In some embodiments, two GbE fabrics may be used for high availability. In other embodiments, the parallel database system 100 can utilize as many communication fabrics 140 as are available for increased performance.

Client devices 105 are computing devices that execute client software, e.g., a web browser or built-in client application, to interact with the parallel database system 100 via a network. Note that the terms "client" or "client device," as used herein may refer to software providing respective functionality, to hardware on which the software executes, or to the entities operating the software and/or hardware, as is apparent from the context in which the terms are used. For example, a client device 105 may execute business intelligence software or analytic tools that send interact with a database system.

In one embodiment, the client device 105 can be a personal computer (PC), a desktop computer, a laptop computer, a notebook, a tablet PC executing an operating system, for example, a Microsoft Windows-compatible operating system (OS), Apple OS X, and/or a Linux distribution. In another embodiment, the client device 105 can be any device having computer functionality, such as a personal digital assistant (PDA), mobile telephone, smartphone, etc. In an embodiment, a client of the database system can be another process, for example, a web server that serves queries from remote devices.

The interactions between the client devices 105 and the parallel database system 100 are typically performed via a network 110, for example, via the internet. The network 110 enables communications between the client device 105 and the parallel database system 100. In one embodiment, the network 110 uses standard communications technologies and/or protocols. In another embodiment, the entities can use custom and/or dedicated data communications technologies instead of, or in addition to, the ones described above. Depending upon the embodiment, the network 110 can also include links to other networks such as the Internet.

System Architecture

Figure 2:
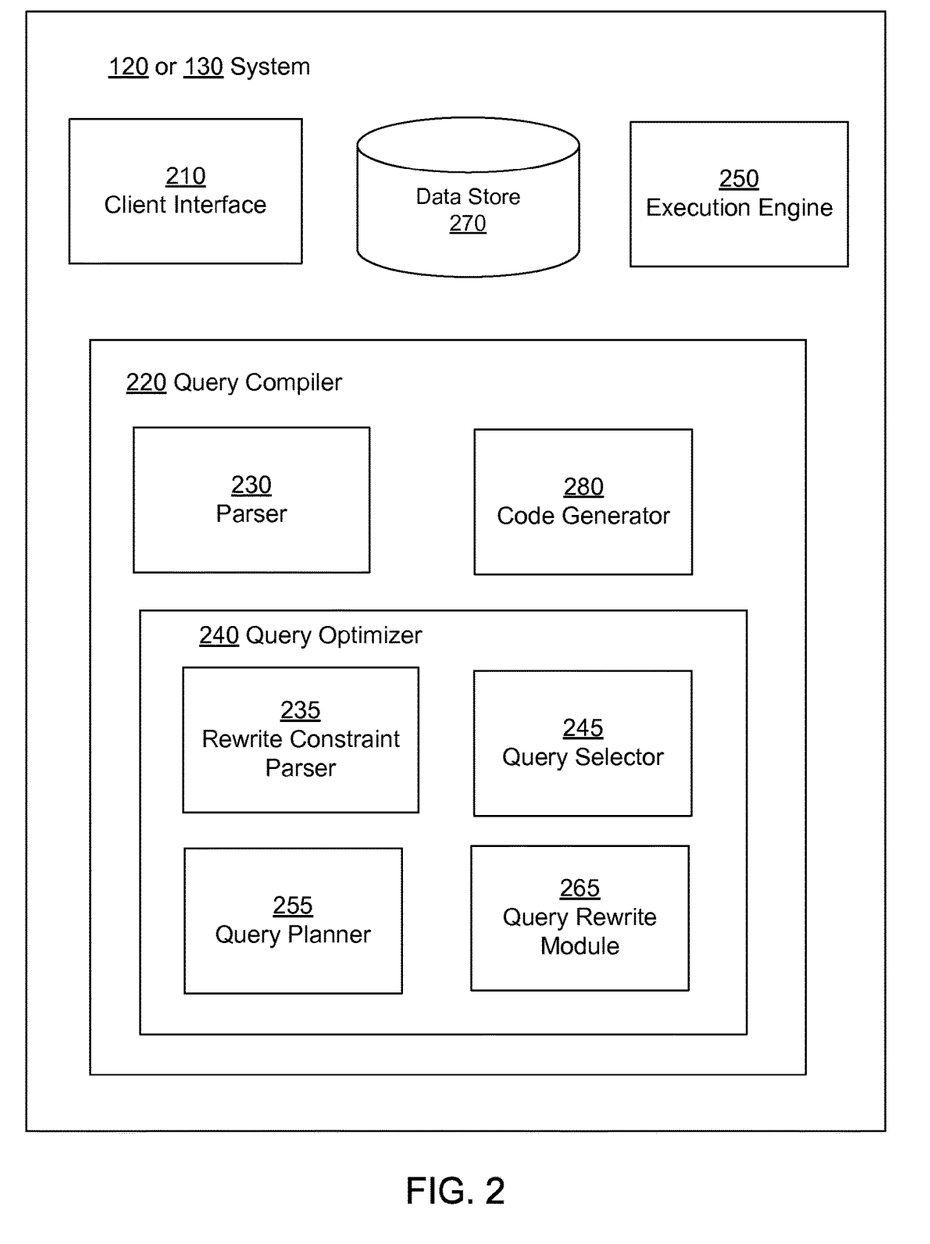
FIG. 2 shows a high level view of internal components and functionality provided by parallel database system, in accordance with an embodiment.

FIG. 2 is a high level block diagram illustrating the system architecture of a node 120, 130 of the parallel database system, for example the leader node 120 or the compute node 130, in accordance with an embodiment. The compute nodes implement a set of processes that manage communication with the leader node to receive commands, send back data, and route compiled code to individual query processes (for each core or slice on the compute node) to execute for a given query.

The node 120 or 130 comprises a client interface 210, a query compiler 220, an execution engine 250, and a data store 270. In alternative configurations, different and/or additional modules may be included in the system. The client interface 210 allows a leader or compute node to interact with client devices 105. Typically the leader node 120 interacts with client devices 105. However compute nodes 130 may interact with external systems, for example, to import or export data. When a new client request comes in to perform a query or some other type of database operation, the leader node 120 spawns a new process to maintain session information for that client. That process is maintained as long as the client session remains open and that client is sending query requests to the leader node 120.

The data store 270 stores the data on a persistent storage, for example, a disk. This data includes relations or tables comprising rows and columns of user data. The query compiler 220 compiles each query to generate a plan for execution of the query and performs any optimizations needed. The query compiler 220 comprises components including a query parser 230, a query optimizer 240, and a code generator 280. The query parser 230 parses an input query to ensure that there are no syntax errors in the query. If a well formed query is provided to the system 120, the query parser 230 builds appropriate data structures to perform further processing of the query, for example, query optimization or code generation. The query optimizer 240 performs optimizations to ensure that a query runs fast.

In an embodiment, the query optimizer 240 comprises components including a query selector 245, a query planner 255, a query rewrite module 265, and a rewrite constraint parser 235. The query rewrite module 265 performs transformations on the query, for example, by rewriting the query to generate a transformed query that can be executed more efficiently. The query planner 255 generates a query plan for executing a query. In an embodiment, the query planner 255 generates a query plan by traversing through a search space comprising various execution plans applicable to a given query. The rewrite constraint parser 235 parses rewrite constraints specifications provided by the user. The query selector 245 matches a rewrite constraints specification against database queries to determine which queries are applicable to a rewrite constraints specification and then selects the matching queries for rewriting. The execution engine 250 executes the query by executing a query plan provided by the planner 290.

Execution of a Query in the Parallel Database System

The following steps detail the high-level operations performed for processing a client request from its initial creation to sending results or status back to the client, to complete the request. After creating a process to maintain the connection with a new client, the system 100 routes the requested operation (a SQL query or some other database operation) through the parser and optimizer to develop a query execution plan to perform or execute the specified query or database operation.

Figure 3:
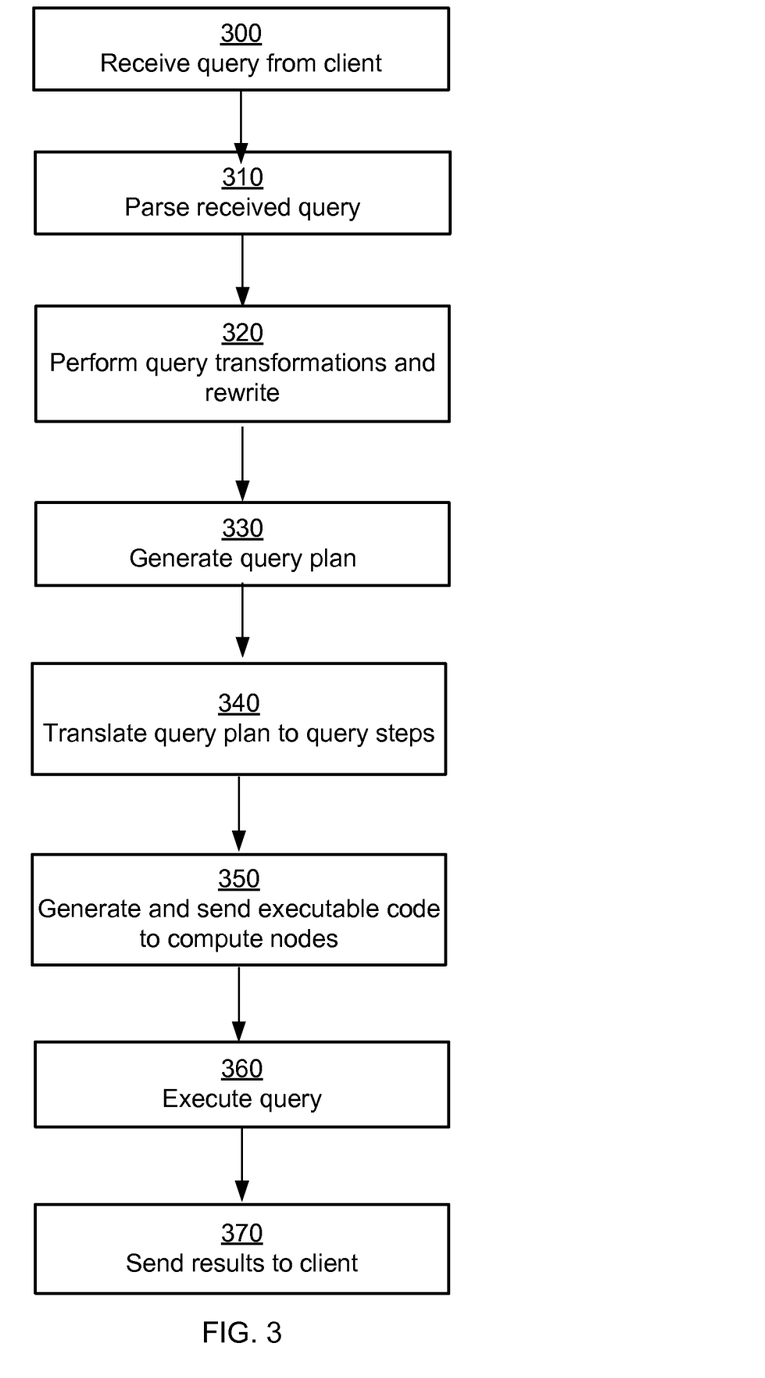
FIG. 3 shows a flowchart for illustrating the processing of a query in the parallel database, in accordance with an embodiment.

FIG. 3 shows a flowchart for illustrating the processing of a query in the parallel database, in accordance with an embodiment. These steps may be performed in orders other than those shown in FIG. 3. Furthermore, each step of the flowchart can be performed by modules different from those indicated below.

The leader node 120 receives 300 a database query from a client 105, for example, an SQL query. The query parser 230 parses 310 the database query received to generate a data structure representing the query. The query rewrite module 265 performs 320 various transformations on the query, for example, by rewriting the query. For example, the query rewrite module 265 may rewrite queries based on rewrite constraints specifications. The query planner 255 generates 330 a physical query plan for the input query. The execution engine 250 translates 340 the physical plan into sequences of query steps. The execution engine 250 generates 350 and sends executable code to various compute nodes.

Each compute node executes 360 the query for the portion of data present on the compute node 130. Each compute node 130 may be considered divided into slices, typically one slice per core or processor. Each slice is associated with a portion of data that is processed by the slice. The slices on each node share the server's memory and disk space to parallelize the workload for a query or other database operation sent to all the compute node servers.

Each compute node 130 includes a communication layer for communicating, for example, with the leader node and a dispatcher that assigns a particular query task to corresponding slice query processes available to perform queries within each compute node. Each slice can have a pool of separate processes that can independently run compiled query code for a slice of data associated with a query task or other database operation. Additional leader and compute node communication processes handle the transfer of commands and data back and forth between the leader node 120 and compute nodes 130 associated with the execution of specific query tasks. The compute nodes determine the result of execution of the query and communicate the result to the leader node. The leader node receives the results and sends 370 the results to the client that sent the query.

In an embodiment each query step corresponds to operators in query plans. Examples of query steps include, HASH, which builds hash table for use in hash joins, HJOIN, which executes hash join of two tables or intermediate result sets, MERGE, which merges rows derived from parallel sort or join operations, SCAN, which scans tables or intermediate result sets, either sequentially or with a range-restricted scan, SORT, which sorts rows or intermediate result sets as required by other subsequent operations (such as joins or aggregations) or to satisfy an ORDER BY clause, DIST, which distributes rows to nodes for parallel joining purposes or other parallel processing, and NLOOP, which executes a nested-loop join of two tables or intermediate result.

Embodiments allow a user to use a command, for example, "explain" command that provides a description of the query plan generated.

Processing Rewrite Constraints

Figure 4:
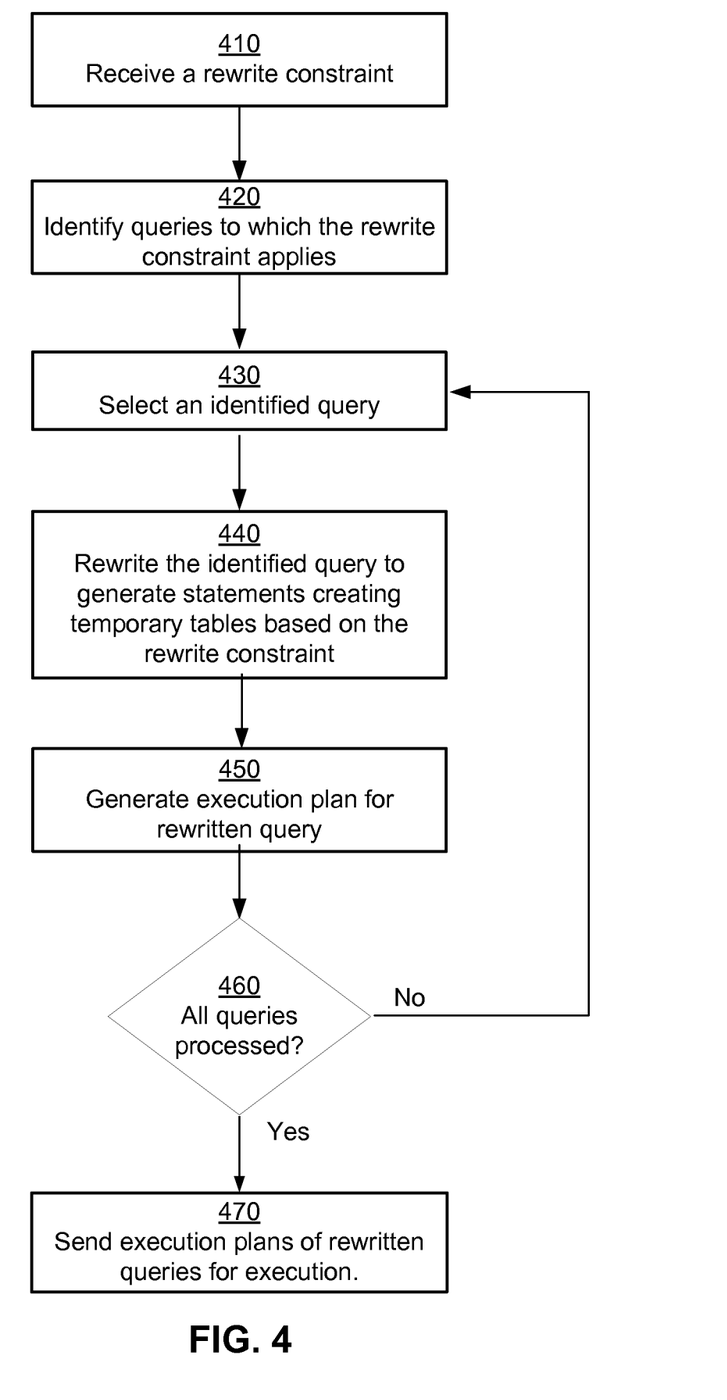
FIG. 4 shows a flowchart for illustrating the processing of a rewrite constraint in a database system, in accordance with an embodiment.

FIG. 4 shows a flowchart for illustrating the processing of a rewrite constraint in a database system, in accordance with an embodiment. The query compiler 220 receives a rewrite constraints specification. The constraint parser 235 parses the rewrite constraints specification received. In an embodiment, the constraint parser 235 builds a representation of the rewrite constraints specification, for example, a parse tree representation or any data structure representing the rewrite constraint.

The query selector 245 identifies 420 queries that are applicable to the rewrite constraint. In an embodiment, the query selector 245 determines whether the attributes specified in the rewrite constraint are applicable to specific queries. For example, if the rewrite constraint specifies that the rewrite constraint is applicable to a subquery identified by alias dt1, the query selector identifies queries that include a subquery identified by alias dt1 and applies the rewrite constraint to the selected queries. If the rewrite constraint identifies a subquery by a particular alias that is not present in a query, the query selector determines that the rewrite constraint is not applicable to that particular query. In another embodiment, a user can specify a set of queries that the rewrite constraint is applicable to. For example, the rewrite constraint may be matched against queries specified in a script file.

The query selector 245 selects 430 an identified query for processing by the query rewrite module 265. The query rewrite module 265 rewrites the query to generate additional statements that generate temporary tables for intermediate results identified in the rewrite constraint. The planner 255 generates 450 execution plans for the rewritten queries. The query selector 245 checks 450 if all queries identified 420 as matching the rewrite constraint are processed. If any query identified 420 as matching the rewrite constraint is not processed, the query selector 245 selects another query that has not been processed and repeats the steps 430, 440, and 450 of the process shown in FIG. 4. If all queries identified 420 are determined 450 to be processed, the query compiler 220 sends the execution plans of the rewritten queries for processing to the execution engine. In other embodiments, the steps described in FIG. 4 can be executed in different order or executed by different modules than described above.

In an embodiment, the database system executes the generated statement to create the temporary table. The optimizer generates statistics describing the temporary table and uses the generated statistics for optimizing the rewritten database query. Since generating the intermediate result relations explicitly as temporary tables allows the database system to generate accurate statistics for the intermediate results, embodiments allow better optimization of the database queries compared to an implementation that attempts to optimize the original database query without accurate statistics of the intermediate results.

In an embodiment, the database system determines that the temporary table for storing the intermediate result is stored in-memory if the size of the temporary table is below a threshold. As a result, the processing of the temporary tables is fast and does not incur the overhead of writing the database tables to secondary storage, for example, a disk.

Rewrite Constraints Specification

In an embodiment, the rewrite constraints are specified using a rewrite constraint language. Each constraint may be specified by a string conforming to the syntax of the rewrite constraint language. Alternatively the rewrite constraints specification may be provided an XML string or any other format, for example, using the Javascript Object Notation (JSON) format. The rewrite constraint may be specified as a command for the database system. The rewrite constraint may be specified using an application programming interface (API).

In one embodiment, a rewrite constraints specification comprises a list of table names. The query selector 280 applies the rewrite constraint to all queries that specify all the tables from the list of tables, for example, in a join operation. Alternatively, the rewrite constraint may specify aliases for tables or subqueries. The query optimizer 240 applies the rewrite constraint to all queries that specify aliases for tables/queries corresponding to the aliases specified in the rewrite constraint.

If the rewrite constraints specification specifies a single alias, the database system determines any database query that includes a subquery with the identified alias to match the rewrite constraints specification. If the rewrite constraints specification specifies multiple aliases, the database system determines that any database query that includes at least a subquery corresponding to each specified alias matches the rewrite constraints specification. In an embodiment, the rewrite constraints specification specifies a list of tables. The database system matches the rewrite specification with the database queries by identifying database queries that join a plurality of database tables, the plurality of database tables including the tables from the list of the rewrite specification.

Examples of Rewrite Constraints

Examples of usage of rewrite constraints for database queries are presented. The tables used in these queries are $t1, t2, t3, \ldots,$ and $tn$. Each table $ti$ includes columns $ai, bi,$ and $ci$. For example, table $t1$ includes columns $a1, b1,$ and $c1$, table $t2$ includes columns $a2, b2$ and $c2$, and so on.

The rewrite constraint can identify an alias or a view name to be materialized. For example, if a query uses a view, the user can specify the name of the view in a rewrite constraint. The query optimizer generates a temporary table for the view and uses the temporary table in the query. For example, the view v is used in the query 'SELECT COUNT(*) FROM v WHERE v1.a1=v1.b1'.

CREATE VIEW v AS (SELECT * FROM t3, t4 WHERE a3=a4 AND a3<3 OR a4>7);

A user can specify a rewrite constraint as "set rewrite_constraint to 'v'." The query optimizer rewrites the above query as follows to generate a temporary table storing the data of the view and use the temporary table in the query.

CREATE TEMP TABLE tt_0(a1) AS
 SELECT * FROM t3, t4 WHERE t3.a3=t4.a4 AND
  t3.a3<3 OR t4.a4>7;

The temporary table tt_0 is created to store data corresponding to view v. The optimizer also analyzes the temporary table tt_0 to generate accurate statistics and optimizes the rewritten query based on accurate statistics. The query is rewritten to use data of the tables tt_0 instead of the view v as follows.

SELECT COUNT(*) AS COUNT FROM tt_0, tt_1
 WHERE tt_0.a1=tt_0.b1

The rewrite constraints specification can provide a list of aliases or view names to be materialized. The query optimizer identifies queries that use any one of the aliases or view names listed in the rewrite constraint and rewrites them by generating temporary tables instead of the subqueries corresponding to the aliases or views used in the query. For example the following statements define views v1 and v2 followed by a query that uses the views.

CREATE VIEW v1 AS
 (SELECT * FROM t1, t2 WHERE a1=a2 AND b1 IN
  (1, 2, 3) OR b2 IN (4, 5, 6));
CREATE VIEW v2 AS (SELECT * FROM t3, t4
 WHERE a3=a4 AND a3<3 OR a4>7);
SELECT COUNT(*) FROM v1, v2 WHERE
 v1.a1=v2.a3;

A user may specify a rewrite constraint as follows that lists both views v1 and v2.

SET rewrite_constraint TO 'v1; v2'

The query optimizer generates statements to create temporary tables for each view and rewrites the query as follows. The temporary table tt_0 is created to store data corresponding to view v1 and the temporary table tt_1 is created to store data corresponding to view v2. The query is rewritten to use data of the tables tt_0 and tt_1 instead of the views v1 and v2. The optimizer also analyzes the temporary tables tt_0 and tt_1 to generate accurate statistics and optimizes the rewritten query based on accurate statistics.

CREATE TEMP TABLE tt_0(a1) AS
 SELECT t1.a1 AS a1 FROM t1, t2
  WHERE t2.b2 IN (4, 5, 6) OR (t1.a1=t2.a2 AND
   t1.b1 IN (1, 2, 3));
CREATE TEMP TABLE tt_1(a3) AS
 SELECT t3.a3 AS a3 FROM t3, t4
  WHERE t4.a4>7 OR (t3.a3<3 AND t3.a3=t4.a4);
SELECT COUNT(*) AS COUNT FROM tt_0, tt_1
 WHERE tt_0.a1=tt_1.a3;

In an embodiment, the rewrite constraints specification specifies a wild card character as the information identifying the portion of the database query for matching. For example, the rewrite constraints specification can be "SET rewrite_constraint TO '*'". In this example, the query optimizer 240 materializes all subqueries. In other words the rewrite constraints specification matches all subqueries of all database queries received. As another example, the user can specify the rewrite constraints specification as "SET rewrite_constraint TO 't*0'". This rewrite constraints specification matches queries having tables with names that start with t, for example, t1, t2, tm, table1, and so on. This rewrite specification fails to match table names that do not start with "t".

In some embodiments when the rewrite constraints specification uses wildcard characters to match multiple subqueries of input queries, the query optimizer does not materialize subqueries that return scalar values. Example of queries that are determined to return scalar values include subqueries that select an aggregate with no grouping criteria or subqueries with a provably false search condition. However in some embodiments, if the rewrite specification uses explicit names of tables, aliases, or views, the named tables, aliases, or views, are materialized even if they are provably scalar.

Alternative Applications

Several embodiments are described herein using a parallel database architecture. However, other embodiments based on a single processor architecture are foreseeable. Furthermore, examples presented are based on relational databases using SQL as language interface. However, other embodiments can be described that allow rewrite constraints specification of other types of database, for example, object based databases. Furthermore, the database query specification is not limited to SQL but can be any query language. The rewrite constraints may be specified programmatically, for example, by using an application programming interface.

Furthermore, although the parallel architecture is disclosed herein as having a leader node and a plurality of compute nodes, other parallel configurations can be used. For example, any one of the compute nodes can act as a leader node. The parallel architecture can be based on a shared memory. Alternatively, the parallel architecture may comprise a distributed system of independent computers interconnected via a network.

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

We claim:

1. A computer-implemented method for rewriting database queries based on rewrite constraints specification, the method comprising:
   receiving a rewrite constraints specification identifying a subquery of a database query, the rewrite constraints specification identifying a subquery by specifying an alias of the subquery, wherein the alias corresponds to one or more intermediate results of a database query;
   identifying, from database queries, matching database queries that the rewrite constraints specification is applicable, comprising:
      matching the rewrite constraints specification with the database queries, and
      for each of the database queries: responsive to determining that the alias of the subquery identified in the rewrite constraints specification matches with at least an alias of a subquery of the database query, determining that the database query is one of the matching database queries; and
   for each matching database query:
      generating a statement to create a temporary table to store the intermediate result relation corresponding to the matching subquery,
      rewriting the matching database query by replacing the matching subquery with the temporary table, and
      executing the rewritten database query, wherein executing the rewritten database query comprises responsive to determining that the size of the temporary table is below a threshold, storing the temporary table in-memory.

2. The computer-implemented method of claim 1, wherein executing the rewritten database query comprises:
   executing the generated statement to recreate the temporary table;
   generating statistics describing the temporary table; and
   using the generated statistics for optimizing to optimize the rewritten database query by selecting an execution plan to execute for executing the database query.

3. The computer-implemented method of claim 1, wherein the rewrite constraints specification specifies a list of aliases including the alias, each alias corresponding to a subquery to identify portions of the database query, wherein matching the rewrite specification with the database queries comprises identifying queries that include a subquery corresponding to each alias from the list of aliases.

4. The computer-implemented method of claim 1, wherein the rewrite constraints specification specifies a view name used by the database query and wherein the temporary table stores the data corresponding to a view statement generating the view.

5. The computer-implemented method of claim 1, wherein the rewrite constraints specification specifies a list of tables, wherein matching the rewrite specification with the database queries further comprises identifying queries that join a plurality of tables including tables from the list of the rewrite specification.

6. The computer-implemented method of claim 5, wherein the statement creating the temporary table generates a temporary table to store the result of join of the list of tables from the matching database query.

7. The computer-implemented method of claim 1, wherein the rewrite constraints specification specifies an expression including a wild card character to identify the subqueries, wherein matching the rewrite specification with the database queries matches all subqueries of the database queries that match the expression.

8. The computer-implemented method of claim 1, wherein matching the rewrite specification with the database queries matches all subqueries of the database queries except subqueries determined to return a scalar result.

9. The computer-implemented method of claim 8, further comprising:

determining that a subquery returns a scalar result responsive to determining that the subquery specifies an aggregate value to be returned with no grouping criteria.

10. The computer-implemented method of claim 8, further comprising:
determining that a subquery returns a scalar result responsive to determining that the subquery specifies a search criterion that evaluates to a false value for all inputs.

11. A computer readable non-transitory storage medium storing instructions for:
receiving a rewrite constraints specification identifying a subquery of a database query, the rewrite constraints specification identifying a subquery by specifying an alias of the subquery, wherein the alias corresponds to one or more intermediate results of a database query;
identifying, from database queries, matching database queries that the rewrite constraints specification is applicable, comprising:
matching the rewrite constraints specification with the database queries, and
for each of the database queries: responsive to determining that the alias of the subquery identified in the rewrite constraints specification matches with at least an alias of a subquery of the database query, determining that the database query is one of the matching database queries; and
for each matching database query:
generating a statement to create a temporary table to store the intermediate result relation corresponding to the matching subquery,
rewriting the matching database query by replacing the matching subquery with the temporary table, and
executing the rewritten database query, wherein executing the rewritten database query comprises responsive to determining that the size of the temporary table is below a threshold, storing the temporary table in-memory.

12. The computer readable non-transitory storage medium of claim 11, wherein executing the rewritten database query comprises:
executing the generated statement to recreate the temporary table;
generating statistics describing the temporary table; and
using the generated statistics for optimizing the rewritten database query by selecting an execution plan for executing the database query.

13. The computer readable non-transitory storage medium of claim 11, wherein the rewrite constraints specification specifies a list of tables, wherein matching the rewrite specification with the database queries further comprises identifying queries that join a plurality of tables including tables from the list of the rewrite specification.

14. The computer readable non-transitory storage medium of claim 11, wherein the rewrite constraints specification specifies an expression including a wild card character to identify the subqueries, wherein matching the rewrite specification with the database queries matches all subqueries of the database queries that match the expression.

15. The computer readable non-transitory storage medium of claim 11, wherein matching the rewrite specification with the database queries matches all subqueries of the database queries except subqueries determined to return a scalar result.

16. A computer-implemented system for rewriting database queries based on rewrite constraints specification, the system comprising:
a computer processor; and
a computer-readable storage medium storing instructions thereon, the instructions for:
receiving a rewrite constraints specification identifying a subquery of a database query, the rewrite constraints specification identifying a subquery by specifying an alias of the subquery, wherein the alias corresponds to one or more intermediate results of a database query;
identifying, from database queries, matching database queries that the rewrite constraints specification is applicable, comprising:
matching the rewrite constraints specification with the database queries, and
for each of the database queries: responsive to determining that the alias of the subquery identified in the rewrite constraints specification matches with at least an alias of a subquery of the database query, determining that the database query is one of the matching database queries; and
for each matching database query:
generating a statement to create a temporary table to store the intermediate result relation corresponding to the matching subquery,
rewriting the matching database query by replacing the matching subquery with the temporary table, and
executing the rewritten database query, wherein executing the rewritten database query comprises responsive to determining that the size of the temporary table is below a threshold, storing the temporary table in-memory.

17. The computer-implemented system of claim 16, wherein executing the rewritten database query comprises:
executing the generated statement to recreate the temporary table;
generating statistics describing the temporary table; and
using the generated statistics for optimizing the rewritten database query by selecting an execution plan for executing the database query.

18. The computer-implemented system of claim 16, wherein the rewrite constraints specification specifies a list of tables, wherein matching the rewrite specification with the database queries further comprises identifying queries that join a plurality of tables including tables from the list of the rewrite specification.

19. The computer-implemented system of claim 16, wherein the rewrite constraints specification specifies an expression including a wild card character to identify the subqueries, wherein matching the rewrite specification with the database queries matches all subqueries of the database queries that match the expression.

* * * * *